United States Patent [19]

Hubert et al.

[11] Patent Number: 5,023,749
[45] Date of Patent: Jun. 11, 1991

[54] CAPACITIVE ANGLE SENSOR IMPROVEMENT

[75] Inventors: Alexis Hubert, Littleton; John A. Shepic, Lakewood, both of Colo.

[73] Assignee: The United States of America as represented by the Secretary of the Army, Washington, D.C.

[21] Appl. No.: 567,999

[22] Filed: Aug. 16, 1990

[51] Int. Cl.⁵ .......................... H01G 7/00; G01P 15/08
[52] U.S. Cl. .............................. 361/292; 73/517 AV
[58] Field of Search ............... 361/277, 278, 280, 283, 361/287, 290, 298; 73/517 AV

[56] References Cited

U.S. PATENT DOCUMENTS 2,478,120 8/1949 Montcalm .......................... 361/292
4,928,203 5/1990 Swindal et al. ..................... 361/280

Primary Examiner—Donald A. Griffin
Attorney, Agent, or Firm—Freddie M. Bush; James T. Deaton

[57] ABSTRACT

A capacitive angle sensor has a rotary capacitor plate mounted between two parallel stationary capacitor plates with groove means being provided for relieving the flow of air between the surfaces of the rotary capacitor plate and the stationary capacitor plates as the rotary capacitor plate is rotated relative to the stationary capacitor plates.

3 Claims, 1 Drawing Sheet

CAPACITIVE ANGLE SENSOR IMPROVEMENT

DEDICATORY CLAUSE

The invention described herein was made in the course of or under a contract or subcontract there under with the Government and may be manufactured, used, and licensed by or for the Government for governmental purposes without the payment to us of any royalties thereon.

BACKGROUND OF THE INVENTION

In the past, because of the tight tolerances used in capacitor plate transducers, trapped air causes excessive damping. Therefore, there is a need for a capacitor plate transducer in which excessive damping is reduce to a minimum or zero.

Accordingly, it is an object of this invention to provide a capacitor plate transducer that has low damping effects due to rotation of the rotator of a capacitor angle sensor relative to stationary capacitor plates.

Another object of this invention is to provide the rotary or stationary plates with grooves for relieving excessive damping of the rotary capacitor plate relative to stationary capacitor plates.

Still another object of this invention is to provide a capacitive angle sensor that can be used for steering mirrors, structural mode simulators, and any very high resolution, small angle sensing requirement with minimal effect on the apparatus.

Other objects and advantages of this invention will be obvious to those skilled in this art.

SUMMARY OF THE INVENTION

In accordance with this invention, a capacitive angle sensor is provided in which stationary capacitor plates are mounted with a rotary capacitor plate there between with grooves provided in the rotary capacitor plate or the stationary capacitor plates to provide passages for relief of air volume between the moving rotary capacitor plate and the stationary capacitor plates. With this arrangement, the air volume between the rotary capacitor plate and the stationary capacitor plates is free to pass through the grooves provided in the capacitor plates.

DESCRIPTION OF THE PREFERRED EMBODIMENT

Figure 1:
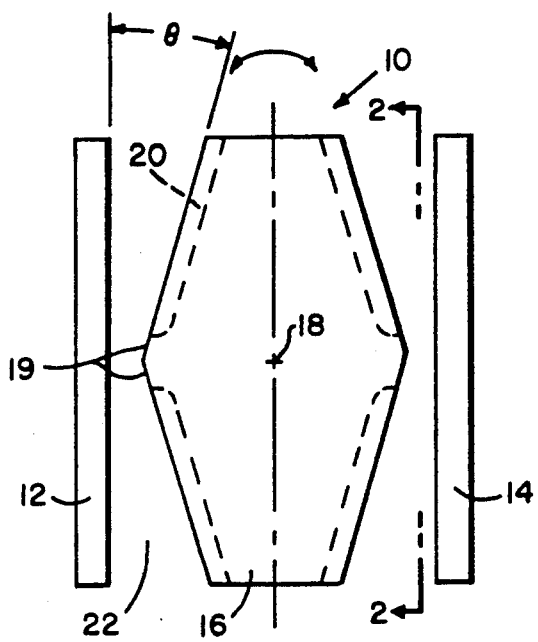
FIG. 1 is an end view of a capacitive angle sensor in accordance with this invention.
Figure 2:
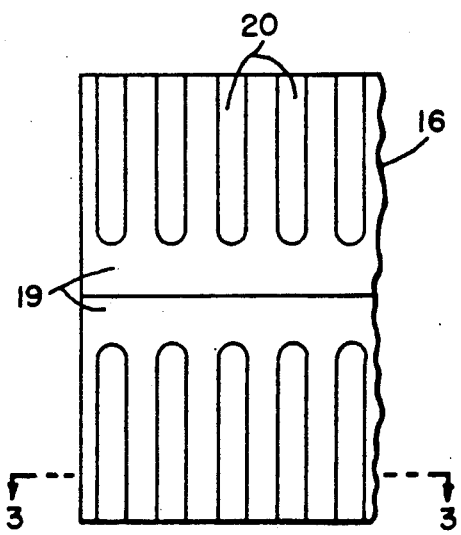
FIG. 2 is a view along line 2—2 of FIG. 1 with a portion cutaway.
Figure 3:
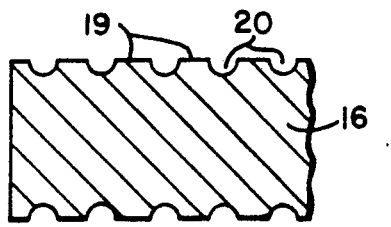
FIG. 3 is a sectional view along line 3—3 of FIG. 2.

Referring now to the drawing, a capacitive angle sensor 10 includes two parallel stationary capacitor plates 12 and 14 with a rotary capacitor plate 16 mounted between plates 12 and 14 and rotatable about axis 18. Rotary capacitor plate 16 has side surfaces 19 with radial grooves 20 cut out of outer surfaces 19. Rotary capacitor plate 16 is rotatable between plates 12 and 14 about axis 18 through angular movement theta. If grooves 20 are not provided, the air in spaces 22 on opposite sides of plate 16 is compressed as rotary capacitor plate 16 is rotated toward plate 12 or 14. Compression of this air volume causes damping of the rotary movement of rotary capacitor plate 16 which is not desirable. By providing grooves 20, rotary capacitor plate 16 can be rotated without damping effect due to there being free air flow between members 12, 14, and 16. Even though grooves 20 have been illustrated as being in rotary capacitor plate 16, these grooves could be in stationary members 12 and 14. By varying the shape of grooves 20, the damping coefficient can be adjusted from a minimum with grooves 20 to a maximum without grooves 20. The damping coefficient is drastically reduced when grooves 20 are utilized.

We claim:

1. A capacitive angle sensor comprising, two parallel stationary capacitor plates with flat side surfaces, a rotary capacitor plate mounted between said parallel stationery capacitor plates, said rotary capacitor plate being mounted for rotation about an axis, said rotary capacitor plate having tapered flat side surfaces to define air spaces between said rotary capacitor plate and said flat side surfaces of said parallel stationary capacitor plates, there being groove means in said flat side surfaces of said plates for allowing free flow of air between the rotary capacitor plate and said stationary plates as said rotary capacitor plate is rotated relative to said stationary capacitor plates.

2. A capacitive angle sensor as set forth in claim 1, wherein said groove means are in said rotary capacitor plate and said groove means extend from surfaces on opposite sides of said rotary capacitor plate to edges of said rotary capacitor plate.

3. A capacitive angle sensor as set forth in claim 2, wherein grooves of said groove means are of uniform depth.

* * * * *